United States Patent

[11] 3,573,382

[72] Inventors James H. Feit Chicago; Francis H. Hilbert, River Grove, Ill.

[21] Appl. No. 797,039
[22] Filed Feb. 6, 1969
[45] Patented Apr. 6, 1971
[73] Assignee Motorola Inc. Franklin Park, Ill.

[54] A STEREOPHONIC RECEIVER MUTING MEANS WITH SUBSTITUTION OF A DC CIRCUIT FOR AN AC CIRCUIT

18 Claims, 1 Drawing Fig.

[52] U.S. Cl. 179/15, 325/348, 325/402, 325/456
[51] Int. Cl. H04h 5/00
[50] Field of Search 179/15 (ST), 15 (P), 15 (LL); 325/348, 402, 403, 408, 456, 478; 330/52; 333/15, 16

[56] References Cited

UNITED STATES PATENTS 3,174,102 3/1965 Berzinski 325/52

*Primary Examiner*—Kathleen H. Claffy
*Assistant Examiner*—Tom D'Amico
*Attorney*—Mueller and Aichele

ABSTRACT: A silicon monolithic integrated circuit stereo multiplex receiver includes a gated symmetrical demodulator for providing the desired left and right audio output signals. A second demodulator is supplied with the same composite input signal supplied to the first demodulator, but substantially attenuated, with the second demodulator providing output signals 180° out of phase with the signal supplied by the first demodulator; and the outputs of the two demodulators are combined so that the crosstalk components are effectively eliminated. A provision also is made for interstation audio muting and for stereo muting by the direct substitution of equivalent DC loads for the AC amplifiers normally responding to the signals, so that transientless muting is achieved. In order to control the muting and to provide a driver for the stereo indicator lamp, trigger circuits having predetermined hysteresis of operation are formed as part of the integrated circuit. Improved symmetrical drive for the demodulator circuit is obtained by feeding the 19 k.c. pilot signal to the doubler circuit across a string of diodes which logarithmically compress signals that would tend to overdrive the doubler transistor amplifier. A filter at the emitter of the doubler amplifier establishes a DC level which is used to fire the indicator lamp trigger circuit to indicate stereo signals are being received and also serves to self-bias the doubler amplifier to further prevent its being overdriven.

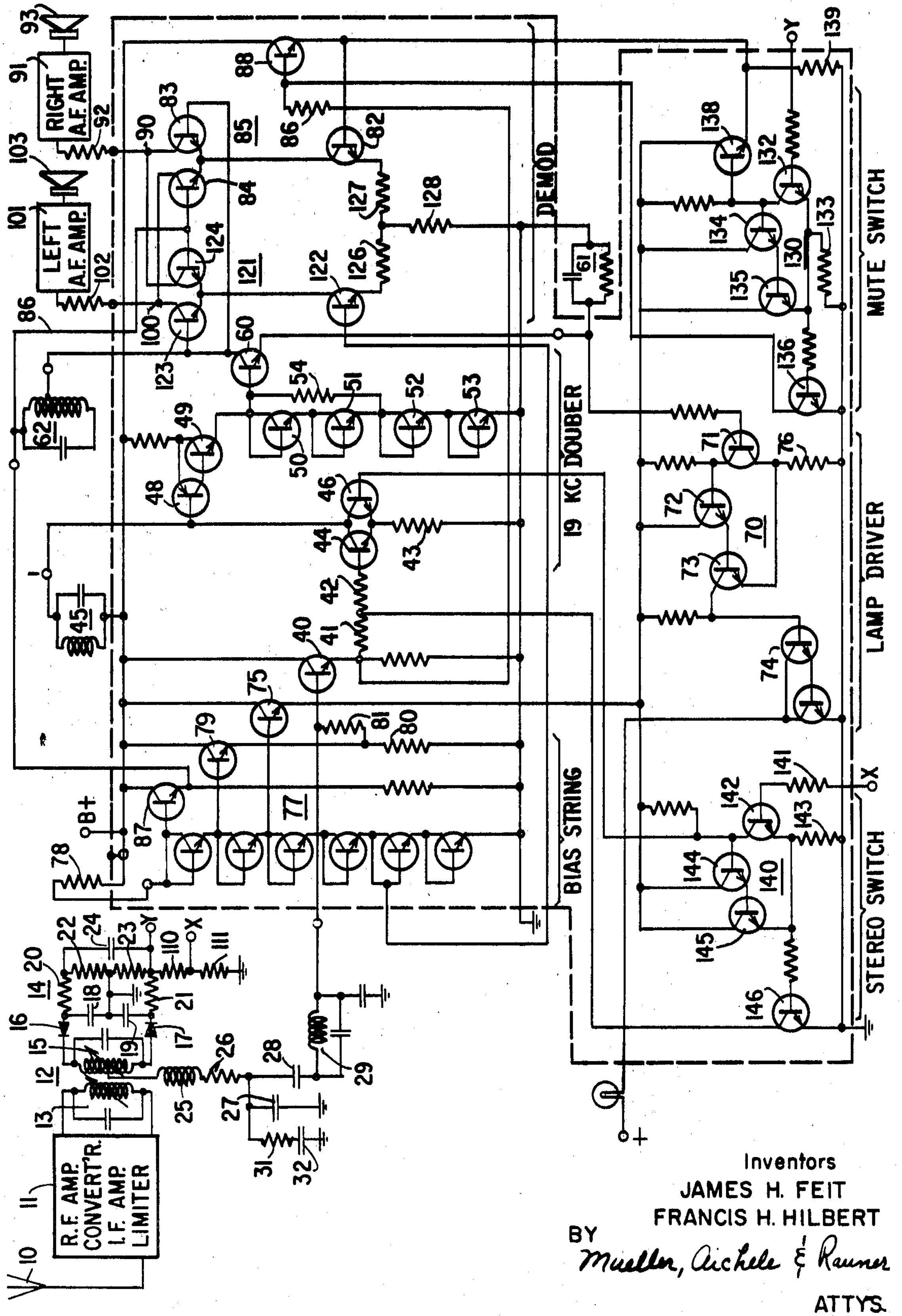
Inventors
JAMES H. FEIT
FRANCIS H. HILBERT
BY Mueller, Aichele & Rauner
ATTYS.

A STEREOPHONIC RECEIVER MUTING MEANS WITH SUBSTITUTION OF A DC CIRCUIT FOR AN AC CIRCUIT

BACKGROUND OF THE INVENTION

Compatible stereophonic multiplex FM radio receivers which operate in response to both monophonic and stereophonic signal information on a single modulated carrier wave have reached a high degree of popularity. The composite stereo signal transmitted by a transmitting station comprises a left channel plus a right channel (L+R) audio summation signal, a left channel minus right channel (L–R) amplitude modulated audio difference signal and a continuous wave pilot signal which presently is of 19 kc. The L+R signals range between zero and 15 kc. and the L–R signals range between 23 and 53 kc., with the L–R signal represented by the side bands of the suppressed subcarrier of 38 kc. In addition, some stations broadcast a background music channel which extends approximately 7 kc. on either side of a 67 kc. subcarrier signal. This background music channel is generally referred to as the "subsidiary communication authorization" (SCA) signal or "storecast" signal.

At a receiver which is adapted to receive either stereo or monaural signals, receipt of the 19 kc. pilot signal is used to derive the 38 kc. subcarrier which then is utilized in a demodulation circuit to derive the desired left and right audio information present in the stereo transmission. Whenever the transmitting station to which the receiver is tuned is not transmitting a pilot signal and is instead broadcasting monaural or single-channel signals, it is desirable to disable the 38 kc. generating circuit in the receiver to disable the demodulation process; so that the received transmission is translated as a monaural broadcast.

Circuits using discrete components for detecting the presence or absence of the 19 kc. pilot signal have existed in the past; and whenever the presence of the 19 kc. signal is not detected, the system automatically reverts to a "monaural receiving" mode of operation and the demodulator circuits are disabled. A problem exists in such circuits, however, because the system for receiving stereo signals which will be acceptable to the listener requires the stereo signals to be of greater received carrier strength than a monaural signal which will be acceptable to a listener. Thus, is it possible that even though the 19 kc. pilot signal is present, unacceptable stereo output will be obtained from the receiver due to the fact that the receiver is tuned to a weak transmitting station. As a consequence, it is desirable to provide some type of stereo muting for weak stereophonic transmission even though stereophonic transmission in fact is being received by the receiver.

In addition, it is desirable to provide for interstation muting of the audio output when the receiver is being tuned from one station to another since the noise between stations in unpleasant to a listener. A problem exists, however, in the use of such muting circuits since it is possible for the circuit itself to generate undesirable audio noises when it is switched into and out of the receiver circuit.

Although stereophonic multiplex FM receivers made of discrete components have been known in the past, it is desirable to provide a stereophonic FM multiplex demodulator circuit in the form of an integrated circuit in order to effect substantial savings in size and cost of the demodulator system. It is especially desirable to provide such an integrated circuit stereophonic multiplex demodulator having the features of automatic stereo-monaural switching and interstation and stereo muting.

SUMMARY OF THE INVENTION

Accordingly it is an object of this invention to provide a stereophonic multiplex receiver having transientless muting of the stereo and audio signals.

It is still another object of this invention to provide a stereo multiplex receiver providing stereo and audio muting by direct substitution of equivalent DC loads for AC responsive devices in order to prevent the formation of transients due to the muting operation.

For muting the audio output, an audio mute switch shuts off the audio amplifier rendering it nonresponsive to AC signals while substituting a DC load equivalent to the DC load of the audio amplifier in its place. Thus, the AC composite signal is removed without significantly affecting the DC operating point of the circuit, so that nearly transientless muting takes place. Similarly, whenever no stereo signals are present or when the stereo signals are of insufficient amplitude, a muting of the 19 kc. amplifier is accomplished by substituting an equivalent DC load in its place, so that once again transientless muting is achieved.

BRIEF DESCRIPTION OF THE DRAWING

The drawing shows a circuit diagram, partially in block form, of a preferred embodiment of a stereophonic multiplex receiver according to the invention.

DETAILED DESCRIPTION

Referring now to the drawing, there is shown a stereophonic multiplex receiver including a demodulator circuit in the form of an integrated circuit which is indicated as enclosed by dotted lines in the drawing. In the receiver shown in the drawing, a frequency modulated (FM) carrier wave containing the sum signal of the right and left audio signals and the difference signal of the right and left audio signals, amplitude modulated on a suppressed subcarrier wave and a pilot signal having a frequency one-half that of the suppressed subcarrier frequency is received by an antenna 10 and is applied to a receiver circuit 11. The circuit 11 represents the usual RF amplifier, converter, IF amplifier and limiter which may be of known design. The output of the circuit 11 then is coupled through a bandpass filter comprising two resonant circuits 13 and 15, the inductances of which are the primary and secondary windings, respectively, of a transformer 12, to a ratio detector 14 where the composite signal containing the stereo sum signal, the stereo difference signal on the suppressed subcarrier wave, and the pilot signal is detected.

Included in the ratio detector 14 are a pair of diodes 16 and 17 which are connected to both sides of the resonant circuit 15 in opposite polarities. The free end of the diode 16 is connected through a capacitor 18 and in parallel through a resistor 20 in series with a resistor 22 to ground. In the same manner, the free end of the diode 17 is connected through a capacitor 19 and in parallel through a resistor 21 in series with a resistor 23 to ground. A tertiary winding 25 of the transformer 12 is connected to the center of the secondary winding of the transformer and is series-connected through a resistor 26 and a capacitor 27 to ground. This winding is used to couple the primary composite FM stereo signal voltage in parallel with the two diodes 16 and 17. The same composite FM stereo signal is applied through the secondary resonant circuit 15 to the ratio detector 14 to provide equal voltages of opposite polarities for the diodes 16 and 17. A capacitor 24 connected across the resistors 22 and 23 provides a stabilizing voltage for the ratio detector, and the voltage across the capacitor 24 varies in proportion to the signal amplitude, as it charges through the two diodes 16 and 17 and automatically adjusts to an operating DC voltage level. The capacitance of the capacitor 24 is chosen to be relatively high, so that it takes an appreciable time for the ratio detector to charge it after a signal is received.

The audio frequency signals representing the right and left signals and the pilot signal are derived from the ratio detector at the junction of the resistor 26 and the capacitor 27 and are applied through a capacitor 28 and a trap and band shaping circuit 29 to the base of an input NPN transistor 40 located on the integrated circuit package. A stable DC operating level for the transistor 40 is obtained from a tap on a transistor diode string 77 connected in series with a resistor 78 between a source of positive potential and ground. The transistors in the string 77 have their bases directly connected to their collectors and are forward biased to provide a constant voltage drop thereacross over a relatively wide range of current flowing through the string. For the transistor 40, the DC operating level is applied from the string 77 through an emitter follower 79 to the junction of a pair of resistors 80 and 81 connected between the base of the transistor 40 and ground. The transistor 79 is used to isolate the string 77 from AC signals applied to the base of the transistor 40. With respect to the composite AC input signal, the transistor 40 is operated as an emitter-follower, supplying an output through a pair of coupling resistors 41 and 42 to the base of another NPN transistor 44 located in the 19 kc. tank circuit. The additional transistor 44 is provided in order to keep the input impedance of the transistor 40 high enough to derive the 19 kc. signal from the input applied to the base of the transistor 40 and to isolate the 19 kc. gain from the input stage.

Assume that the input signal at this time is a composite stereo input signal and that it is of sufficient magnitude to be detected and demodulated by the circuit shown in the drawing. The 19 kc. component of this signal is applied by the collector of the 19 kc. amplifier transistor 44 to one side of a 19 kc. tuned tank circuit 45, the other side of which is connected to a source of positive potential. Under the conditions of signal input which are outlined above, an NPN transistor 46, the collector-emitter path of which is connected in parallel with the collector-emitter path of the transistor 44, is nonconductive therefore having no affect on the operation of the circuit. The transistor 46 is used in muting of the 19 kc. path, as will be explained subsequently. The 19 kc. tank circuit 45 resonates in response to the pilot signal which then is fed to the base of a PNP transistor 48, the emitter and collector of which are connected to the collector and base of an NPN transistor 49. This combination functions as a PNP amplifier and is used due to the fact that an integrated circuit PNP amplifier having suitable amplification characteristics is difficult to achieve with the present state of integrated circuit technology. Thus, it is necessary to provide the NPN transistor 49 as the output for the PNP transistor 48. The output load of the transistor 49 is a string of four series-connected NPN transistors 50, 51, 52 and 53 which are fabricated in the form of diodes on the integrated circuit chip by connecting the base of each NPN transistor 50—53 to its collector in common with the collector input. The transistors 50 and 51 are connected in parallel with a resistor 54, with the junction between the collector of the transistor 50 and the resistor 54 being connected to the base of an NPN transistor 60 which is the input amplifier for the 38 kc. doubler circuit. The transistor 60 is normally biased nonconductive and initially is rendered conductive when the positive peaks of the 19 kc. signal obtained from the transistor 49 and applied to the base of the transistor 60 are sufficient to forward bias the transistor 60.

Due to the fact that the transistor diodes 50 through 53, once biased into their forward conducting mode of operation, provide a relatively constant voltage drop thereacross irrespective of the current passing through them, the load consisting of these transistor diodes logarithmically compresses any 19 kc. signal peaks which otherwise would tend to overdrive the doubler amplifier 60 into saturation. This is apparent from the fact that as the signal peaks applied to the transistor diodes 50—53 from the output of the transistor 49 continue to increase, the increased current applied through the transistors 50—53 results in only slightly increased biasing potential applied to the base of the transistor 60, resulting in a logarithmic compression of the input signal supplied to the transistor 60. The number of transistors 50 through 53 is chosen to provide the desired amount of compression necessary to prevent overdriving of the transistor 60 and to provide sufficient DC signal at the emitter of transistor 60 to activate a stereo lamp driver 70.

In addition to provision of the logarithmic compression of the input signals applied to the transistor 60, an RC filter 61, having a large capacitance with a long discharge time constant, is connected between the emitter of the transistor 60 and ground, and establishes a DC level which serves to self-bias the emitter of the transistor 60 to further prevent overdriving of the transistor. The collector of the transistor 60 is connected to a tank circuit 62 which resonates at 38 kc. Since the transistor 60 is rendered conductive only on the peaks of the 19 kc. signal, strong second harmonics are present and the tank circuit 62 resonates to provide a 38 kc. signal at the collector of the transistor 60. It can be seen that no clipping or limiting of the 19 kc. signal occurs, with the 38 kc. signal being limited by the manner in which the transistor 60 is driven while preventing the transistor 60 from being driven to saturation. Operation of the circuit in this manner substantially reduces the generation of unwanted harmonics which occurs when limiting is achieved by clipping the 19 kc. signal. A symmetrical 38 kc. output signal is obtained; so that it is free of second and higher-order even harmonics, resulting in the elimination of the need for the usual "storecast" filters.

In addition to providing a self-bias for the transistor 60, the DC level obtained from the filter 61 is applied to the base of a normally nonconductive NPN transistor 71 in a trigger circuit 70. When this DC voltage reaches a level to overcome the first stable state of the trigger circuit 70 by causing the input transistor 71 to be rendered conductive, an output stage in the form of a pair of Darlington coupled output transistors 72 and 73 is rendered nonconductive, thereby causing the potential applied to the base of a second Darlington amplifier 74 to rise to a positive potential obtained from the output of an emitter follower transistor 75 which is driven by the potential obtained from a tap on the voltage reference string 77. Thus the Darlington amplifier 74 is rendered conductive, causing current to flow between ground and a source of positive potential through a stereo indicator lamp, energizing or lighting the lamp.

The composite signals present on the emitter of the transistor 40 are applied through a coupling resistor 86 to the base of an emitter follower transistor 88 which is used to drive the input of a first demodulator input transistor 82 in accordance with the composite signals. The collector of the transistor 82 is connected to the emitters of a pair of transistors 83 and 84 which are operated as a first gated synchronous demodulator 85. The gating signals for the demodulator 85 are obtained from the 38 kc. signal developed at the collector of the transistor 60 which supplies the gating signals to the base of the transistor 83. The base of the transistor 84 is supplied with a DC reference potential through a lead 86 connected to the output of an emitter follower 87, the base of which is controlled by a reference potential obtained from the reference signal string 77 in the manner described previously. This DC reference potential supplied to the base of the transistor 84 also is supplied to the base of the transistor 83.

The operation of the demodulator circuit 85 is such that the 38 kc. gating signals applied to the circuit from the collector of the transistor 60 are effective to alternately render the transistors 83 and 84 conductive and nonconductive, with the transistor 83 being driven to conduction when the transistor 84 is cut off and vice versa. At the same time, the transistor 82 is operated class A; so that whenever the reference signal applied to the base of the transistor 83 is positive with respect to the bias signal applied to the base of the transistor 84, the transistor 83 is turned on and due to the differential action of the transistors 83 and 84 transistor 84 is turned off, thereby causing the composite input signals present on the collector of the transistor 82 effectively to be coupled directly through the fully turned-on transistor 83 to an output terminal 90 connected to a Right audio frequency amplifier 91 through a coupling resistor 92. The output of the amplifier 91 is connected to a suitable loudspeaker 93. During the next half cycle of the 38 kc. gating signal, the potential of the gating signal applied to the base of the transistor 83 is less than the DC bias voltage applied to the base of the transistor 84, so that the transistor 83 is rendered fully nonconductive and the transistor 84 is driven fully conductive. When this occurs, the composite signals present on the collector of the transistor 82 are applied through the transistor 84 to an output terminal 100 connected to a Left Audio frequency amplifier 101 through a coupling resistor 102, with the output of the amplifier 101 being used to drive a suitable loudspeaker 103.

Thus the reintroduced 38 kc. subcarrier wave which is used to control the switching or gating of the demodulator transistors 83 and 84 is used to separate the R-signal envelope from the L-signal envelope by causing these envelopes to be separately detected by the switching of the transistors 83 and 84.

A substantially equal amount of crosstalk is present at each of the output terminals 90 and 100 connected respectively to the collectors of the transistors 83 and 84; so that the signals applied to the Right and Left amplifiers 91 and 101 are not pure R- and L-signals as is desired. In order to eliminate this crosstalk from the output signals applied to the amplifiers 91 and 102, a second synchronous demodulator 121, identical to the demodulator 85, is provided. This second synchronous demodulator 121 is comprised of a pair of switching or demodulating transistors 123 and 124 which correspond to the transistors 83 and 84 in the demodulator 85. The emitters of the transistors 123 and 124 are supplied with signals from the collector of a demodulator input transistor 122, the base of which is connected to a source of DC reference potential obtained from a tap on the bias string 77. The same DC potential also is applied to the base of the transistor 82.

Signals for driving the transistor 122 are coupled to its emitter through a T-resistance circuit consisting of three resistors 126, 127 and 128, with the resistors 126 and 127 being connected in series between the emitter of the transistor 122 and the emitter of the transistor 82, and with the resistors 128 being connected between ground and the junction of the resistors 126 and 127. Thus, the signals applied to the base of the transistor 82 from the transistor 88 also appear in substantially attenuated form on the emitter of the transistor 122, with the degree of attenuation being determined by the relative values of the resistors 126, 127 and 128. The amount of attenuation chosen is selected to be such that the primary signals appearing on the collector of the transistor 122 are equal in magnitude to the magnitude of the crosstalk signals appearing at the outputs of the switching transistors 83 and 84 in the demodulator 85.

The demodulator transistors 123 and 124 have their collectors connected, respectively, to the corresponding terminals 100 and 90. With respect to each of these terminals, it can be seen that the transistors 124 and 123 are driven 180° out of phase with the transistors 83 and 84 by the 38 kc. switching or gating signals obtained from the collector of the transistor 60. In other words, when the transistor 83 is rendered conductive by the signal on the collector of the transistor 60, the transistor 123 also is rendered conductive and the transistors 84 and 124 are rendered nonconductive and vice versa. As a consequence, when the transistor 83 is conductive to supply the desired R-signal to the amplifier 91 along with a relatively small component of crosstalk from the L-signal, the transistor 123 supplies an attenuated R-signal plus a small L-crosstalk component to output terminal 100. This attenuated R signal is 180° out of phase with the signal supplied to the terminal 100 by the transistor 84, so that the R-signal from the transistor 123 is subtracted from the R-crosstalk signal supplied to the terminal 100 by the transistor 84. The magnitude of the attenuated R-component obtained from the transistor 123 is chosen to be equal to the magnitude of the R-crosstalk component obtained from the output of the transistor 84. Thus, the out-of-phase attenuated R cancels the R-crosstalk component present at the terminal 100. The small amount of attenuated L-crosstalk component present at the output of the transistor 123 also subtracts from the desired L-output of the transistor 84, but this reduction in the L-output is so small that is has no noticeable affect on the operation of the circuit.

A similar cancellation of the undesired L-crosstalk signal in the R-output obtained from the terminal 90 is effected by the operation of the demodulator transistor 124 providing a 180° out-of-phase attenuated L-signal combined with the L-crosstalk signal obtained from the principal demodulator transistor 83 for the R-channel. Thus, it is seen that an effective elimination of crosstalk is obtained by the use of the two demodulators 85 and 121, with both demodulators being supplied with the same input signal, except that the demodulator 121 is supplied with a greatly attenuated signal and is operated 180° out-of-phase with the primary demodulator 85 in order to effect cancellation of the crosstalk components from the signal.

In addition to providing crosstalk cancellation, the demodulator 121 fills in the "holes" in the outputs of the demodulator 85 to maintain a constant DC operating point at the inputs to the amplifiers 91 and 101, i.e. the 38 kc. injection signal does not appear at the outputs.

Now assume that the stereo input signal drops to a level where degradation of performance is noticeable in the signals reproduced by the loudspeakers 103 and 93. When this occurs, such as when the receiver is tuned to a weak station, it is desirable to switch the receiver from a stereo mode of operation to a monaural mode of operation since monaural reception can provide satisfactory listener outputs at lower R.F. carrier signal levels than is possible for satisfactory stereo reception. Such switching from a stereo mode to a monaural mode of operation should be effected as unobtrusively as possible. In the circuit shown, this is accomplished by substituting a DC load or circuit, having the same DC operating level as the signal responsive circuit, for the signal responsive circuit as the input to the 19 kc. tank circuit.

In order to control switching of the receiver from stereo to monaural operation or to mute the audio output during interstation tuning, a DC control signal proportional to the input signal strength may be derived from a linear portion of the I.F. circuit or from the ratio detector 14. As stated previously, the capacitor 24 is charged to a DC potential which is proportional to the magnitude of the signal input applied to the ratio detector 14. If the signal level should drop, the charge on the capacitor 24 likewise will drop. This drop in potential then is reflected as a drop in potential at a terminal X which is connected to a voltage divider consisting of a pair of resistors 110 and 111 connected between the capacitor 24 and ground. The terminal X is connected to the input terminal of a trigger circuit 140 through a resistor 141 to the base of an NPN input transistor 142 of the trigger circuit. For high signal levels, that is signal levels when the charge on the capacitor 24 is considered sufficient to indicate that good stereo reception may be obtained from the receiver, the positive potential applied from the capacitor 24 through the terminal X and the resistor 141 to the base of the transistor 142 is sufficient to drive the transistor 142 into conduction; so that the potential on the collector thereof is slightly above ground as determined by the value of the emitter resistance 143 connected to the transistor 142. This collector potential is coupled to the base of the transistor 46 to render the transistor 46 nonconductive since the potential on the emitter of the transistor 46 is more positive than the potential being applied to its base during normal stereo reception.

When the potential obtained from the capacitor 24, however, drops to a level sufficient to remove the forward bias on the transistor 142, the transistor 142 is rendered nonconductive; so that the potential on its collector rises to bias the transistor 46 into conduction to the same degree of DC conduction that the transistor 44 previously conducted. At the same time that the transistor 142 is rendered nonconductive, the Darlington output transistors 144 and 145 in the trigger circuit 140 are rendered conductive to in turn drive an output transistor 146 into conduction causing ground potential to be applied to the base of the transistor 44, causing the transistor 44 to be driven to cutoff for low level stereo input signals.

It should be noted that the DC operating level of the circuit is not changed since the DC circuit path from the tank circuit 45 to ground through a common emitter resistor 43 continues to include a single collector-emitter junction, which is now that of the transistor 46 instead of the transistor 44 and which junction is rendered conductive to the same DC extent that the collector-emitter junction of the transistor 44 was conductive prior to the above-described operation of the trigger circuit 140. Thus, even though the 19 kc. pilot signal may be present in the low-level signal being received by the system, the magnitude of the signal level is considered to be below that which would provide suitable performance of the receiver; so that the stereo mute switch in the form of the trigger circuit 140 disables the 19 kc. circuit thereby causing the system automatically to revert into a monaural mode of operation. Because the DC circuit remains unchanged through the operation of the 19 kc. muting, there is no formation of transients which can cause undesirable noise signals which otherwise might be transmitted through the system to the audio frequency output amplifiers 91 and 101. The system provides for "-transientless" muting of the stereo for low-level input signals.

Without the presence of the 19 kc. signal, there is no 38 kc. signal; so that the capacitor in the R-C circuit 61 discharges to cause the trigger circuit 70 to revert to its original state, with the transistors 74 being nonconductive, and the stereo indicator lamp is extinguished. In addition, there is no 38 kc. gating signal applied to the demodulators 85 and 121, so that the DC bias applied to the bases of all of the transistors 83, 84, 123 and 124 drives these transistors into conduction, with the result that the same signals appear at both output terminals 90 and 100. This is the same type of operation which results for normal monaural reception since no 19 kc. pilot signal is present for monaural broadcasts.

Assume now that the input signal level detected by the discriminator circuit 14 drops even further, such as which would occur between stations during tuning of the receiver. In such an event, it is desirable to provide for some type of interstation muting of the audio output; so that the objectionable hissing sounds which occur during the interstation tuning are not coupled through the system to the audio frequency amplifiers 91 and 101. As with the stereophonic muting, this interstation muting should be unobtrusive and this is accomplished by disabling the signal responsive circuit, while at the same time substituting a DC load or circuit having the same DC operating level or output as the DC operating level of the signal responsive circuit.

The signal level between stations when the receiver is being tuned drops sufficiently so that the voltage on the capacitor 24 drops even further than the drop described above in conjunction with the stereo muting operation. This drop is detected at an output terminal Y connected to the junction of the capacitor 24 and the resistor 110. The terminal Y also is connected to the input of a third trigger circuit 130. Normally the positive potential present on the terminal Y is sufficient to drive the input transistor 132 in the trigger circuit 130 into a stage of conduction, so that a pair of Darlington coupled output transistors 134 and 135 are rendered nonconductive. In this state of operation, the transistor 136 connected to the output of the transistor 135 is also rendered nonconductive to provide a positive forward biasing DC operating level to the signal responsive transistor 88, which couples the input transistor 40 to the demodulator circuits 85 and 121.

At the time the signal level obtained from the terminal Y drops to a voltage which is insufficient to forward bias the transistor 132, the transistor 132 is rendered nonconductive and, through snap-action operation of the trigger circuit 130, drives the transistors 134 and 135 into full conduction. This in turn renders the transistor 136 conductive, coupling ground potential through the collector thereof to the base of the transistor 88 to render the transistor 88 nonconductive and therefore nonresponsive to signals applied to its base from the output of the transistor 40.

At the same time, in order to prevent the occurrence of muting transients, a transistor 138 which is nonconductive when the transistor 132 is conductive, is rendered conductive when the transistor 132 is rendered nonconductive. The DC bias applied to the base of the transistor 138 is the same as the DC bias previously applied to the base of the transistor 88 by the transistor 40. The emitter of the transistor 138 is coupled to the emitter of the transistor 88 at the junction of that emitter and an emitter resistor 139 connected to ground. The DC potential now applied to the base of the transistor 82 is obtained from the transistor diode string 77 through the emitter-follower transistor 75 and the transistor 138 and is equal to the DC level normally obtained from the transistor 88. As a consequence, a direct substitution of the same DC operating level is made on the base of the transistor 82, even though the transistor 88 is rendered nonconductive to render the circuit nonresponsive to the AC composite signal. As a result, no additional transient filters are required in the system.

The trigger circuits 70, 130 and 140 are similar with variations in the manner in which the outputs are obtained. These trigger circuits provide extremely stable operation independent of supply voltage changes and provide accurately controlled hysteresis in their operation. The supply or input voltage for the trigger circuits is obtained, as outlined previously, from a tap on the bias string 77 applied through the transistor 75 to provide a voltage drop from the power supply voltage equal to the drop across the base-emitter junctions of three transistors. By tying the trigger circuits back to this voltage supply through the bias string 77 in order to obtain the desired operating voltage level, a significant resistor area is saved on the integrated circuit chip on which this stereo multiplex demodulator circuit is formed.

In addition, the drop across the emitter resistors 76, 143 or 133 is caused to be equal to essentially the voltage drop across one diode junction of a typical transistor in the circuit when the input transistors of the respective trigger circuits are rendered nonconductive. As a consequence the input transistor 71, 142 or 132 is rendered conductive when the voltage applied to the base thereof is equal to the forward voltage drop across the diode junctions of two typical transistors in the circuit (1.35 volts). Once the input transistor is rendered conductive, regeneration takes place and the input transistor saturates, causing a voltage equal to approximately 0.1 volt to appear across the emitter resistor 76, 143 or 133. This voltage is established by the ratios of the emitter and collector resistors with the collector resistor being approximately 10 times the resistance of the emitter resistor. As a result opposite triggering of the trigger circuit occurs at approximately 0.81 volts (the forward voltage drop across one transistor junction plus 0.1 volts). This causes a known DC hysteresis to be present in the operation of the trigger circuit, which prevents the circuit from being placed in a transient or "in between" state where undesirable switching of the trigger circuit could be caused by ripple or noise signals.

In addition, it is apparent that adjustment of the ratios of the collector and emitter resistors connected to the input transistor of the trigger circuit can cause compression or expansion of the hysteresis of the circuit. Due to the fact that the conventional capacitors and resistors utilized in conventional trigger circuits have been eliminated from the trigger circuits 70, 140 and 130, a further advantage is realized when the circuits are used in the integrated circuit system, since the formation of the transistors used in the circuit requires far less space on the integrated circuit chip than the resistors or capacitors which are associated with conventional trigger circuits.

We claim:

1. An AC signal processing system including in combination:

first circuit means for utilizing AC signals;

a source of AC signals;

input means coupling the source of AC signals and the first circuit means for supplying said AC signals to the first circuit means, the output of the input means having a predetermined DC operating level;

DC circuit means providing a DC operating level which is substantially the same as said predetermined DC operating level of the input means; and muting means for substituting the output of the DC circuit means for the output of the input means supplied to the first circuit means so that muting of the first circuit means for AC signals is accomplished without a change in the DC operating level at the input thereof.

2. The combination according to claim 1 further including means controlled by the muting means for disabling the input means to render the input means nonresponsive to said AC signals.

3. The combination according to claim 1 wherein the input means includes transistor means supplied with said AC signals and biased to operate at a predetermined DC level and wherein the DC circuit means also includes transistor means supplied with a biasing potential and biased to operate at substantially the same predetermined DC level.

4. The combination according to claim 1 further including monitoring means responsive to the signal level of said AC signals for causing operation of the muting means in response to signal levels below a predetermined amount.

5. The combination according to claim 1 wherein said AC signal processing system includes an audio frequency signal processing system, said signal source is an audio frequency signal source, and said first circuit means utilizes audio frequency signals.

6. The combination according to claim 1 wherein said AC signal processing system processes stereophonic FM signals including, in part, a pilot signal, and wherein the first circuit means is a pilot signal separating circuit with the source of AC signals being, at least in part, a source of said pilot signal.

7. The combination according to claim 1 wherein the first circuit means, input means and muting means all are part of an integrated circuit and wherein the input means includes an input transistor supplied with said AC signals and biased to a predetermined DC operating level, the DC circuit means includes a further transistor biased to substantially said same predetermined DC operating level, and the DC circuit means is connected to the circuit means for utilizing AC signals in the same manner as the input means when said DC circuit means is substituted for said input means, so that the DC operating level of said integrated circuit is substantially unchanged by said substitution.

8. The combination according to claim 7 wherein the input transistor and the further transistor each include base, emitter, and collector electrodes, the collector electrodes being connected together to the first circuit means, and the emitter electrodes being connected together, with the input transistor normally being conductive and supplied with said AC signals and a DC biasing potential on the base thereof and the further transistor normally being nonconductive, operation of the muting means rendering the further transistor conductive and the input transistor nonconductive.

9. The combination according to claim 7 wherein the input transistor and the further transistor each include at least input and output electrodes with the output electrodes being connected in common to the first circuit means, the input electrode of the input transistor being connected to the source of AC signals, and the input electrode of the further transistor being controlled by DC signals from the muting means.

10. A muting circuit for a signal wave receiver including in combination:

- a load;
- input signal responsive circuit means operated at a predetermined DC operating level for supplying signals to the load;
- DC circuit means connected to the load in parallel with the input signal responsive means; and
- switching means having first and second output conditions and connected to the input signal responsive circuit means and the DC circuit means for rendering said input signal responsive means conductive and for rendering the DC circuit means nonconductive when the switching means is in its first output condition, and for rendering the input signal responsive means nonconductive and for rendering the DC circuit means conductive when the switching means is in its second output condition, the DC current level through the load being the same irrespective of which circuit means is rendered conductive.

11. The combination according to claim 10 wherein the input signal circuit responsive means and the DC circuit means each include electronic amplifying means with input and output electrodes, the output electrodes being connected in common to the load, and the input electrodes being controlled by the switching means, with the input electrode of the signal responsive amplifying means being further controlled by the received input signal, said amplifying means operating at a predetermined DC level when rendered conductive.

12. The combination according to claim 11 wherein the amplifying means are transistors of the same conductivity type and the switching means provides the same DC bias to the input electrodes of the transistors when the transistors are rendered conductive.

13. In a stereophonic FM receiver of the type for receiving composite stereophonic multiplex signals including audio frequency signals, a pilot signal and a modulated subcarrier signal with circuit means for separating the pilot signal from the remainder of the composite signal and with audio circuit means for processing said audio frequency signals for application to the output of said receiver, said receiver further including switching circuit means for muting the pilot signal and the audio frequency signal, said switching circuit means including in combination:

- pilot signal muting means responsive to a first output from said switching circuit means and connected to the pilot signal separating circuit means for substituting a DC load having substantially the same DC operating level as the pilot signal separating circuit means for the pilot signal separating circuit means; and
- means responsive to a second output of the switching circuit means and connected to the audio circuit means for substituting for the audio frequency circuit means a DC load having substantially the same DC operating level as the DC operating level of the audio circuit means.

14. The combination according to claim 13 further including means for monitoring the signal level of the received FM signals and providing first and second control signals to the switching circuit whenever the input signal level attains first and second predetermined levels, said control signals causing said switching circuit to produce said first and second outputs respectively.

15. The combination according to claim 13 wherein the pilot signal separation circuit means and the audio circuit means include active components in the form of integrated circuit transistors responsive respectively to the pilot signal and the audio frequency signals, and wherein the respective DC loads substituted for said pilot signal separating circuit means and said audio circuit means also include integrated circuit transistor means operated at a constant DC level to render the receiver nonresponsive to said pilot signal separating means and said audio circuit means whenever said DC load is substituted therefor.

16. In a stereophonic FM receiver of the type for receiving composite stereophonic multiplex signals including a pilot signal and also operating in response to monaural FM signals, a circuit for automatically switching the mode of operation from stereophonic reception to monaural reception whenever the input signal level drops below a predetermined level, said automatic switching circuit including in combination:

- means for monitoring the signal level of the received FM signals;
- switching means responsive to the output of the signal monitoring means for producing an output signal whenever the signal from the output of the monitoring means indicates the received signal level is below a predetermined value;
- means having a predetermined DC operating level for separating the pilot signal from the remainder of the composite signal received by the receiver;
- means responsive to the output of the pilot signal separating means for producing output signals indicative of the receipt of stereophonic signals; and
- means connected to the pilot signal separating means and controlled by the output of the switching means for substituting a DC load having said DC operating level for the pilot signal separating means in response to the output signal from the switching means indicating that the received signal level is below said predetermined value.

17. The combination according to claim 16 wherein the pilot signal separating means is disabled by the switching means when the received signal level is below said predetermined value, so that the receiver is rendered insensitive to the pilot signal while at the same time the DC operating levels of the circuit remain substantially unchanged in order to provide transientless muting of stereophonic signals for low signal levels.

18. The combination according to claim 16 wherein the switching means is operated to remove said output signal whenever the signal from the output of the monitoring means indicates the received signal level is above a second predetermined value which is higher than said predetermined value casing the switching to produce said output signal.